United States Patent [19]

Ziegenhain et al.

[11] 4,133,871

[45] Jan. 9, 1979

[54] PROCESS FOR PREPARING ALUMINA

[75] Inventors: William C. Ziegenhain; Ronald L. Poe; Larry L. Bendig; John F. Scamehorn, all of Ponca City, Okla.

[73] Assignee: Continental Oil Co., Ponca City, Okla.

[21] Appl. No.: 820,528

[22] Filed: Aug. 1, 1977

[51] Int. Cl.² .............................................. C01F 7/02
[52] U.S. Cl. ..................................... 423/628; 423/630
[58] Field of Search ................................ 423/628, 630

[56] References Cited

U.S. PATENT DOCUMENTS

| | | | |
|---|---|---|---|
| 2,776,188 | 1/1957 | Gilbert | 423/630 |
| 2,796,326 | 6/1957 | Kimberlin et al. | 423/630 |
| 2,805,920 | 9/1957 | Richardson | 423/630 |
| 3,264,063 | 8/1966 | Carter | 423/630 |
| 3,384,458 | 5/1968 | McCarthy et al. | 23/283 |
| 3,394,990 | 7/1968 | Weingaetimer et al. | 423/630 |
| 3,419,352 | 12/1968 | Acciarri | 423/630 |

Primary Examiner—Herbert T. Carter
Attorney, Agent, or Firm—Bayless E. Rutherford, Jr.

[57] ABSTRACT

An improvement in the method of preparing alumina by water hydrolysis of aluminum alkoxides is disclosed. Briefly, the improvement comprising admixing the water and aluminum alkoxide under high velocity conditions prior to passing the resulting admixture to the reactor. The improved process results in a product having improved physical properties, particularly pore volume and bulk density.

8 Claims, No Drawings

PROCESS FOR PREPARING ALUMINA

FIELD OF THE INVENTION

The invention is in the field of preparing alumina by water hydrolysis of aluminum alkoxides.

GENERAL BACKGROUND

The preparation of alumina by water hydrolysis of aluminum alkoxides is well-known. Alumina prepared by this process has many uses, such as catalyst for organic reactions, desiccant, and adsorbent. When subjected to certain calcination conditions the alumina is particularly useful as a catalyst for a variety of reactions.

A convenient way of preparing the aluminum alkoxides involves preparing a mixture of high-molecular-weight aluminum trialkyls by the Ziegler process. The aluminum trialkyls are then oxidized to the corresponding aluminum alkoxides.

A typical hydrolysis process is one wherein the water and aluminum alkoxides are fed continuously to a reactor. In the reactor two operations occur. First, the aluminum alkoxides are hydrolyzed, forming alumina and alcohols. Second, a phase split occurs between the water-alumina slurry and the alcohols. Subsequently, the alcohols and alumina-water phases are withdrawn from the reactor. The alumina-water slurry is subjected to further processing to eventually obtain the dried alumina, substantially free of alcohols.

We have found that high velocity injection of the aluminum alkoxides into the reactor results in an alumina product having improved physical properties. Unfortunately, this procedure destroys the alcohol-slurry (water-alumina) interface so that phase separation does not occur satisfactorily.

We have found that the advantages of high injection velocity can be attained by admixing the water and aluminum alkoxides under high velocity conditions prior to passing the resulting admixture to the reactor.

PRIOR ART

In considering patentability of the subject invention, the following references were reviewed: U.S. Pat. Nos. 2,975,201; 3,087,954; 3,217,058; 3,264,063; 3,384,458; 2,776,188; 2,796,326; 2,805,920; 2,917,366; 3,394,990 and 3,419,352.

Of these only the following were considered of sufficient pertinency to warrant discussion herein. U.S. Pat. No. 3,264,063 teaches the spraying of alkoxide onto the surface of water in order to cause reaction to form alcohols. U.S. Pat. No. 3,419,352 teaches hydrolysis in water-containing ammonia. The examples in this latter reference teaches aluminum alkoxide feed rates as high as 150 pounds per hour. This feed rate falls within Applicants' definition of high velocity injection.

However, none of the references teach admixing of the alkoxide and water under high velocity conditions prior to passing the reaction admixture to the reaction vessel. Accordingly, in Applicants' opinion the references are not pertinent to Applicants' invention.

BRIEF SUMMARY OF THE INVENTION

Broadly stated, the present invention is directed to an improvement in the method of preparing alumina by water hydrolysis of aluminum alkoxides, wherein the alkoxide groups contain from 2 to 40 carbon atoms, wherein the improvement comprises admixing the water and aluminum alkoxides under high velocity conditions prior to passing the resulting admixture to the reactor.

DETAILED DESCRIPTION

Any aluminum alkoxide containing 2 or more carbon atoms in the alkoxy group can be used in our process. Usually, the alkoxy group contains a maximum of 40 carbon atoms, more usually, a maximum of 30 carbon atoms. Usually, the aluminum alkoxides are a mixture containing alkoxy groups of differing carbon content. When, pure aluminum alkoxides are used it is preferable that the maximum carbon content be 18 or lower in order that the material will be a liquid.

Our process is particularly suitable for use with aluminum alkoxides prepared by oxidation of aluminum trialkyls prepared by the Ziegler process. As is well-known the alkyl groups in these aluminum trialkyls contain from 2 to 40 carbon atoms, more usually 2 to 30 carbon atoms, with a predominant amount of 8 to 16 carbon atom alkyls.

While our process can be operated on a batch basis preferably it is operated on a continuous basis since this is preferred in commercial operations.

The important feature of our process is admixing the water and aluminum alkoxide under high velocity conditions prior to passing the resulting admixture to the reactor. Knowing that the admixing occurs prior to entering the reactor the specific means of doing this can be designed by any person skilled in the art. For example, the water and alkoxide can unite conjointly as by having a tee-joint connection. Also, the alkoxide can be injected onto the water stream and both passed on to the reactor. Further, the water and alkoxide can be added to a manifold adjacent to the reactor.

The aluminum alkoxide is at high velocity when it is admixed with the water. The water may be at high velocity, if desired. As used herein the term "high velocity" means greater than 40 feet per second as determined using the formula $$V = F/pA$$

wherein $V$ = velocity, $F$ = rate of flow in pounds per second, $p$ = density in pounds per cubic foot, and $A$ = orifice area in square feet. Preferably, the velocity is greater than 100 feet per second. More preferably, the velocity is greater than 170 feed per second.

The relative amounts of water and aluminum alkoxide suitable is in the range of about 0.5 to about 5 pounds of water per pound of aluminum alkoxide. Preferably, the amount of water is in the range of about 1.0 to about 3, on the same basis.

The aluminum alkoxides suitably are at a temperature in the range of about 50 to about 150° C., preferably in the range of about 70 to about 120° C.

The water suitably is at a temperature in the range of about 40 to about 150° C., preferably in the range of about 70 to about 120° C.

The water-aluminum alkoxide admixture is then passed to the reactor. The remainder of the process is as described in the General Background section.

The alumina produced by our process is predominantly a mixture of boehmite and pseudoboehmite, usually containing at least 80 percent of these. More usually, the alumina will contain at least 90 percent of a mixture of boehmite and pseudoboehmite. Also, the alumina produced by out process has a higher pore volume and lower bulk density than alumina prepared by the conventional process. Higher pore volume means more surface area which usually is advantageous. Lower bulk density is a commerical advantage since the product is usually sold by volume.

In order to illustrate the nature of the present invention still more clearly the following examples will be given. It is to be understood, however, that the invention is not to be limited to the specific conditions or details set forth in these examples except insofar as such limitations are specified in the appended claims.

EXAMPLES

The aluminum alkoxides used in these examples were prepared from aluminum trialkyls prepared by the Ziegler process. The alkoxide groups had the following carbon number composition.

| Carbon No. | Weight % |
|---|---|
| $C_2$ | 0.42 |
| $C_4$ | 2.85 |
| $C_6$ | 8.25 |
| $C_8$ | 14.71 |
| $C_{10}$ | 18.78 |
| $C_{12}$ | 18.57 |
| $C_{14}$ | 14.95 |
| $C_{16}$ | 10.15 |
| $C_{18}$ | 5.94 |
| $C_{20}$ | 3.00 |
| $C_{22}$ | 1.41 |
| $C_{24}$ | 0.58 |
| $C_{26}$ | 0.22 |
| $C_{28}$ | 0.08 |
| $C_{30}$ | 0.02 |
| $C_{32}$ | 0.01 |
| | 100.00 |

Runs were made having a high alkoxide velocity and a high alkoxide and water velocities. The process conditions are shown below. Also shown are the process conditions for a standard run (i.e. — no high velocity).
Run A = standard run
Run B = high alkoxide velocity
Run C = high water and alkoxide velocities

| Process Conditions | Run A | Run B | Run C |
|---|---|---|---|
| Injection Nozzle | | | 0.04(2) |
| Diameter, inches | 0.158(1) | 0.031(1) | 0.04 |
| Reactor Temperature, °C. | 93.9 | 96.1 | 95.6 |
| Alkoxide Temperature, °C. | 82.8 | 84.4 | 74.4 |
| Water Temperature, °C. | 87.2 | 81.1 | 90.6 |
| Alkoxide Injection Velocity, (ft/sec) | 6.9 | 178 | 93.6 |
| Alkoxide Flow Rate (lb/hr) | 182 | 180 | 159 |
| Water Flow Rate (lb/hr) | 200 | 195 | 187 |

(1)alkoxide only
(2)for both alkoxide and water

From the reactor until the finished product (alumina) was obtained the conditions of the runs were substantially the same. More specifically, the alcohol and slurry phases were withdrawn from the reactor. The water-alumina slurry was subjected to a butanol extractor and to a steam stripping operation to remove alcohol. The slurry was then spray dried.

The physical properties of the products obtained from the three runs are shown below.

| Property | Run A | Run B | Run C |
|---|---|---|---|
| Surface Area ($M^2$/Gm) | 288 | 312 | 355 |
| Loose Bulk Density (lb/$ft^3$) | 44.7 | 28.4 | 32.3 |
| $Al_2O_3$ Content (Wt. %) | 72.4 | 71.2 | 73.8 |

| Pore Volume Distribution (cc/Gm) | Run A | Run B | Run C |
|---|---|---|---|
| 0 – 50 A | 0.15 | 0.14 | 0.26 |
| 0 – 100 A | 0.43 | 0.43 | 0.48 |
| 0 – 250 A | 0.45 | 0.48 | 0.53 |
| 0 – 500 A | 0.46 | 0.52 | 0.57 |
| 0 – 1,000 A | 0.47 | 0.55 | 0.61 |
| 0 – 10,000 A | 0.50 | 0.76 | 0.74 |

Thus, having described the invention in detail, it will be understood by those skilled in the art that certain variations and modifications may be made without departing from the spirit and scope of the invention as defined herein and in the appended claims.

We claim:

1. In the method of preparing alumina by water hydrolysis of aluminum alkoxides in a reactor, and wherein the alkoxide groups contain from 2 to 40 carbon atoms, the improvement comprising admixing the water and aluminum alkoxide, wherein said aluminum alkoxide has a velocity of greater than 40 feet per second, prior to passing the resulting admixture to the reactor, said improved process being characterized further in that
   (a) the resulting product has improved pore volume and bulk density properties and
   (b) the velocity is defined by the formula $$V = F/pA$$

wherein V = velocity in feet per second, F = rate of flow in pounds per second, p = density in pounds per cubic foot, and A = orifice area in square feet.

2. The method of claim 1 wherein the amount of water is in the range of about 0.5 to about 5 pounds per pound of aluminium alkoxide.

3. The method of claim 2 wherein the water has a velocity of greater than 40 feet per second.

4. The method of claim 2 wherein the alkoxide has a velocity greater than 100 feet per second.

5. The method of claim 2 wherein (a) the temperature of the water is in the range of about 50 to about 150° C. and (b) the temperature of the alkoxide is in the range of about 40 to about 150° C.

6. The method of claim 5 wherein the water has a velocity of greater than 40 feet per second.

7. The method of claim 5 wherein the alkoxide has a velocity of greater than 100 feet per second.

8. The method of claim 1 wherein
   (a) the amount of water is in the range of about 1.0 to about 30 pounds per pound of aluminum alkoxide,
   (b) the alkoxide has a velocity of greater than 170 feet per second, and
   (c) the temperature of the water and the alkoxide is in the range of about 70 to about 120° C.

* * * * *